Jan. 10, 1928.  1,655,826
E. H. SPECHT
TRUNK RACK MOUNTING
Filed July 25, 1927    2 Sheets-Sheet 1

INVENTOR.
Edward H. Specht
BY
Townsend, Loftus & Abbett
ATTORNEYS.

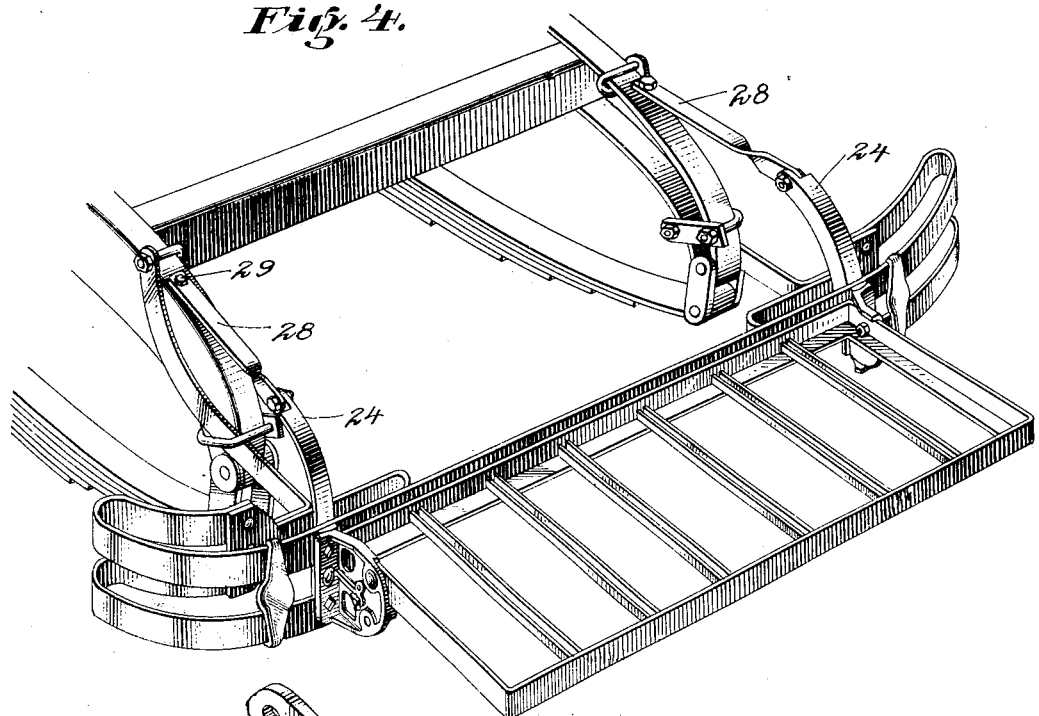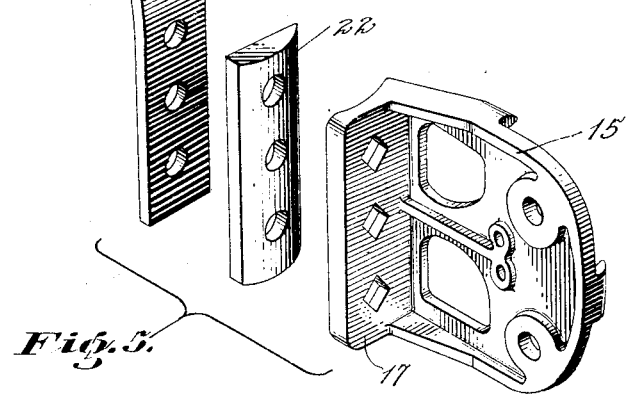

Patented Jan. 10, 1928.

1,655,826

UNITED STATES PATENT OFFICE.

EDWARD H. SPECHT, OF OAKLAND, CALIFORNIA, ASSIGNOR TO AMERICAN CHAIN COMPANY, INC., OF BRIDGEPORT, CONNECTICUT, A CORPORATION OF NEW YORK.

TRUNK-RACK MOUNTING.

Application filed July 25, 1927. Serial No. 208,107.

This invention relates to automobile accessories and particularly pertains to folding trunk racks adapted to be mounted upon bumper structures of the automobile.

The present invention is concerned with means by which a trunk rack may be conveniently mounted upon an automobile bumper or bumper tips secured in protecting positions across the rear of an automobile frame, the general construction being somewhat similar to that shown in my copending application entitled Trunk rack, filed December 8, 1926, and bearing Serial No. 153,229.

In the present case, however, means are provided to insure that the trunk rack mountings will be universally adapted to the contour of the impact faces of the bumper structure and that, in addition, simple means will be provided for carrying part of the overhanging weight of the trunk rack and for relieving the bumper and its mountings from excessive and damaging strains.

The present invention contemplates the provision of brackets adapted to be secured to the rear faces of bumper members and in conjunction with which, means are provided to permit the brackets to readily conform to said faces and to be firmly clamped thereagainst. The structure also contemplates means securing the brackets to the frame of the vehicle independent of the bumper mountings and by which, weight imposed on the brackets may be carried.

The invention is illustrated by way of example in the accompanying drawing in which:

Fig. 4 is a fragmentary view showing the rear of an automobile carrying bumper tips and upon which a trunk rack is mounted, said view disclosing another form of brace for the brackets.

Fig. 5 is an enlarged fragmentary view showing the form of the invention disclosed in Fig. 4 and particularly disclosing the adjustable filler block.

Figure 1:
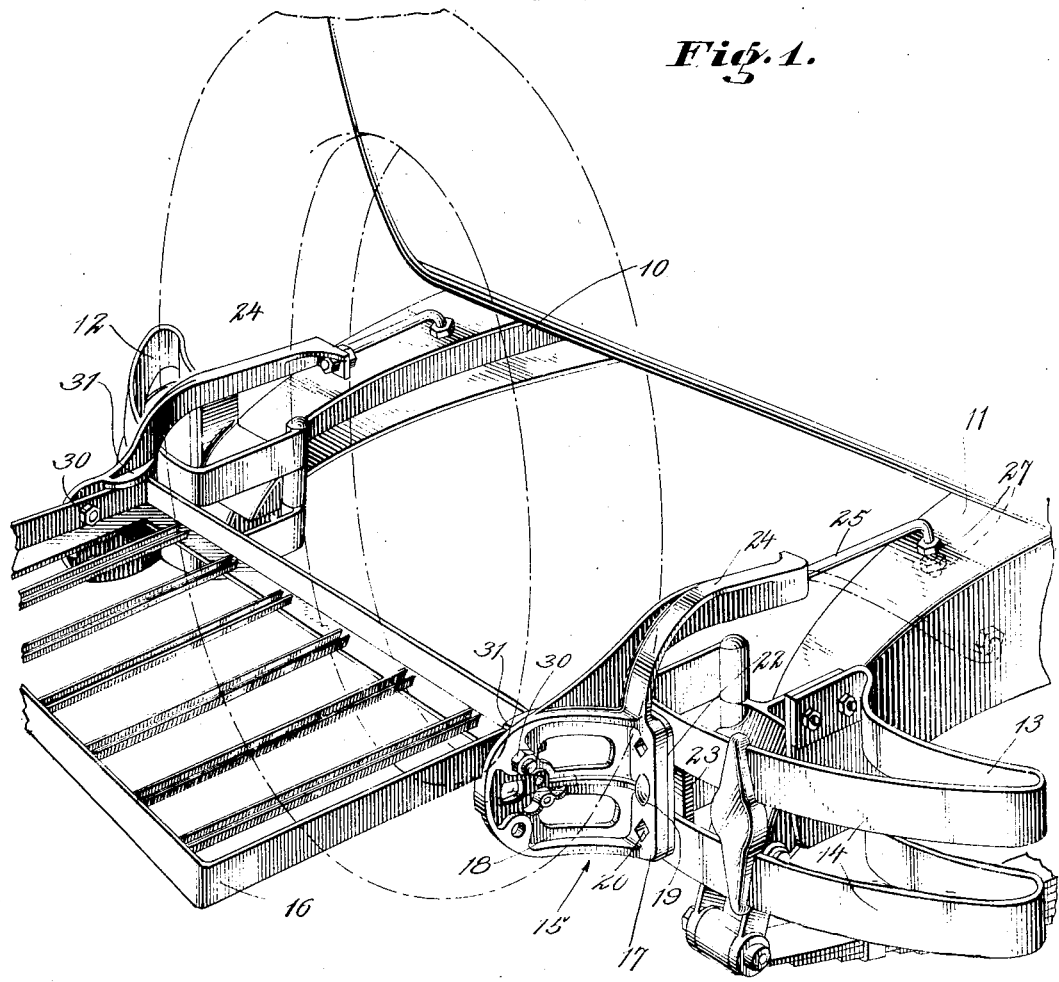
Fig. 1 is an enlarged fragmentary view in perspective showing the preferred structure with which the present invention is concerned.

Referring more particularly to the drawings, 10 and 11 indicate the rearwardly extending side frame members of an automobile. Mounted upon these members in some suitable manner and being disposed in a horizontal plane transversely of the end of the frame, is a bumper structure. As shown in the drawings, this bumper structure comprises two independent bumper tips or bumper wings generally indicated at 12 and 13. It will be understood however, that the bumper structure may extend entirely across the rear of the vehicle while carrying an intermediate impact section and that this will not depart from the spirit of the present invention. The bumper wings 12 and 13 are here shown as being formed of a plurality of bars 14. These bars are disposed in substantially the same vertical plane and serve as impact members acting to ward off blows which would otherwise be delivered to the fenders of the vehicle.

It is understood that the exact design of the bumper wings is not essential, but that the present invention is more particularly concerned with bracket structures 15 by which a trunk rack 16 may be pivotally secured transversely of the rear of the automobile and so mounted as to be readily swung from a vertical to a horizontal position or vice versa.

The brackets are here shown as castings having a bolting pad 17 and a rearwardly extending bracket arm 18. The pad and arm are substantially at right angles to each other so that bolts 19 may pass through one or more of the openings 20 in the pad and may permit the bolts to rigidly fasten the bracket onto the bumper structure.

Figure 2:
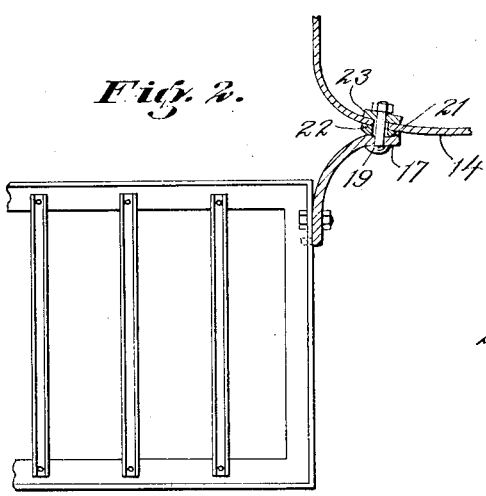
Fig. 2 is a fragmentary view in plan with parts broken away to more clearly show the manner in which the trunk rack mounting is adapted to the contour of the bumper bars.
Figure 3:
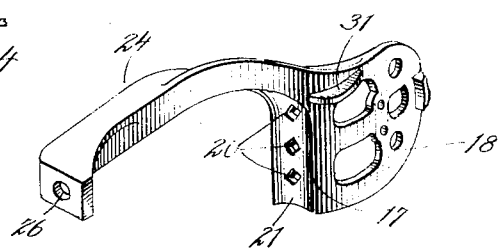
Fig. 3 is a view in perspective showing one of the trunk rack mountings and particularly disclosing the weight supporting arm carried thereby.

By reference to Figs. 2 and 5 of the drawing, it will be seen that the clamping face 21 of the pads 17 is arcuate horizontally and that a complementary convexed face is formed on a filler plate 22 which latter is interposed between the arcuate concave face of the pad 17 and the rear face of the impact portion of the bumper structure.

A clamping plate 23 is disposed upon the opposite sides of these bars and receives the bolts 19. By this arrangement it is possible to insure that a rigid fastening may be effected between the supporting brackets 15 and the bumper structure and which fastening will be sufficiently secure to sustain the load imposed upon the trunk rack 16 when this rack is in its substantially horizontal position.

In order to adequately support the weight which is being carried by the overhanging trunk rack 16, tension arms 24 are provided. In the form of the invention shown in Fig. 1 these arms are cast integral with the brackets, while in the form of the invention shown in Fig. 4 the arms are formed as continuations of the bolting plates 23. In either case they extend upwardly and forwardly of the vehicle frame and are fitted with connecting members by which they are conveniently fastened to the frame.

In the form of the invention shown in Fig. 1 these connections are shown as being tension rods 25, one end of which rods is extended through openings 26 in the end of the tension rod 24. The opposite end extends through a suitable opening formed in the frame member and may be secured in position by clamping nuts 27. In the form of the invention shown in Figs. 4 and 5, a tension link 28 is pivoted to the upwardly and forwardly extending end of the bracket 24 and is also secured to the frame as by the cap screw 29 shown in Fig. 4.

It is to the understood, of course, that the trunk rack 16 is pivotally mounted between a pair of the brackets 15 and upon pivot bolts 30 and that the brackets carry lugs 31 which act as stops to support the rack when in its horizontal position.

It will thus be seen that by the structure here disclosed it is possible to conveniently and detachably mount a trunk rack upon a bumper structure and to insure that the weight upon the trunk rack will be adequately supported without imparting undue strain to the affected parts.

While I have shown the preferred form of my invention as now known to me, it is to be understood that various changes may be made in its construction without departing from the spirit of the invention as defined in the appended claims.

Having thus described my invention, what I claim and desire to secure by Letters Patent is—

1. The combination with a bumper structure adapted to be disposed transversely of the rear of a vehicle, a trunk rack, means for mounting said trunk rack upon said bumper and at the rear thereof and means for directly connecting the trunk rack structure with the frame of the vehicle whereby the load carried upon the trunk rack will be partially supported by the frame.

2. The combination with a bumper structure adapted to be disposed transversely of the rear of a vehicle, brackets secured to the rear face of the bumper structure and extending horizontally therefrom, a trunk rack secured to the brackets and overhanging the same while disposed in the horizontal plane and means connecting the horizontally projecting brackets with the main frame of the vehicle at points forwardly of the bumper structure mounting whereby a portion of the load carried by the trunk rack will be supported through said connections to the main frame.

3. The combination with a bumper structure adapted to be disposed transversely of the rear of a vehicle and secured to the vehicle main frame, a pair of rearwardly extending brackets secured to the bumper structure in spaced relation to each other, a trunk rack fastened to the brackets and projecting horizontally and rearwardly therefrom, extension arms associated with the brackets and extending upwardly and forwardly over the bumper structure and means connecting said extension arms with the vehicle main frame whereby to reinforce the brackets.

4. The combination with a bumper structure adapted to be disposed transversely of the rear of a vehicle, a trunk rack mounting bracket adapted to be secured against the rear impact face of the bumper structure, said bracket having a bolting flange through which a bolt may pass and by which the bracket may be secured to the bumper structure and a filler plate disposed between the bolting flange and the impact face of the bumper structure whereby the bracket will be adapted to the contour of the face against which it is bolted.

5. The combination with a bumper structure adapted to be disposed transversely of the rear of a vehicle, a pair of brackets secured to the rear impact face of said bumper structure, said brackets having rearwardly projecting arms, a trunk rack secured to said arms, bolting pads formed as a part of said brackets and by which the brackets are secured to the bumper structure, supporting arms formed integral with the bracket structure and extending upwardly and forwardly over the bumper and means connecting the forward ends of said arms with the vehicle main frame to assist in supporting the weight imposed upon the trunk rack.

EDWARD H. SPECHT.